Aug. 25, 1925.
J. LEDWINKA
1,551,161
WINDOW CONSTRUCTION FOR AUTOMOBILE BODIES
Filed May 3, 1922
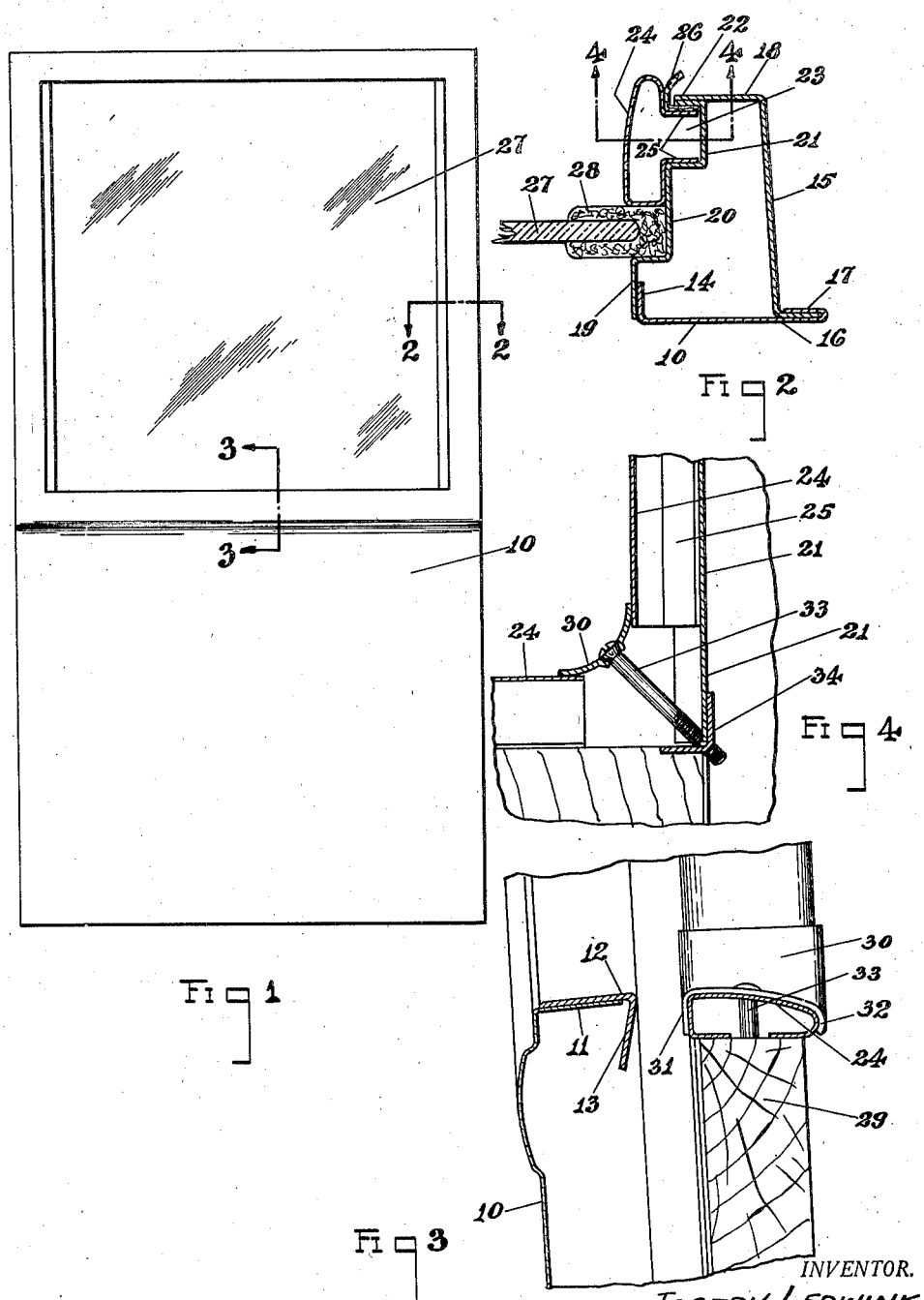
INVENTOR.
JOSEPH LEDWINKA
BY
ATTORNEY
WITNESS:—

Patented Aug. 25, 1925.

1,551,161

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

WINDOW CONSTRUCTION FOR AUTOMOBILE BODIES.

Application filed May 3, 1922. Serial No. 558,170.

*To all whom it may concern:*

Be it known that I, JOSEPH LEDWINKA, a citizen of the United States, residing at Philadelphia, Pennsylvania, have invented certain new and useful Improvements in Window Constructions for Automobile Bodies, of which I declare the following to be a full, clear, and exact description.

My invention relates to an improved window construction for automobile bodies.

The principal object of my invention is to provide a window construction which is particularly suitable for automobile bodies, and including a window frame and improved means for detachably retaining the window-glass or pane in said frame.

A further object of my invention is to provide a window construction for automobile bodies including a metal window-frame and means for detachably fastening retaining pieces or moldings to said frame, so as to removably secure said window-glass or pane in the frame.

A further object of my invention is to provide removable retaining pieces or finishing moldings secured to a window frame, for removably holding the window pane therein, without using any fastening screws or members passing through such retaining or finishing strips or members.

A further object of my invention is to provide a window construction for automobile bodies which presents a particularly pleasing and sightly appearance, is simple and inexpensive to manufacture, and in which the window can be removed very quickly and easily when desired.

Further objects, and objects relating to details and economies of construction and operation, will definitely appear from the detailed description to follow. I accomplish the objects of my invention, in one instance, by the devices and means described in the following specification. My invention is clearly defined and pointed out in the appended claims. A structure constituting a preferred embodiment of my invention is illustrated in the accompanying drawing, forming a part of this specification, in which:

Fig. 1 is a view in elevation of an automobile door embodying a window construction in accordance with my invention.

Fig. 2 is an enlarged, detail, sectional view, taken on line 2—2 of Fig. 1.

Fig. 3 is a detail, sectional view, taken on line 3—3 of Fig. 1, and

Fig. 4 is a detail, sectional view, taken on the line 4—4 of Fig. 2.

In the drawings, the same reference numerals refer to the same parts throughout the several views and the sectional views are taken looking in the direction of the arrows at the ends of the section lines.

In general, my invention consists of a window frame having means for receiving and retaining a window pane or glass and removable retaining pieces or members detachably secured to the frame and engaging an edge or edges of the pane to hold it in the frame. These retaining pieces or strips may be secured in place by corner brackets which lap over the adjoining ends of such strips and are fastened to the frame so that no fastening screws or members extend through the retaining strips themselves. The adjoining ends of the retaining strips may be spaced from each other so that they will not interfere with each other when any one of these strips is to be removed and the bolt or screw for fastening the corner bracket in place may pass between the adjoining ends of such retaining strips. In order to prevent lateral movement of the retaining strip or member, I may provide a channel in the window frame, adjacent the window run, and provide a projecting flange or tongue on the retaining strip or member which seats in this channel. My invention is particularly applicable to a metallic window frame construction and the retaining strip or member may be formed of a piece of metal bent to form a finishing molding of sightly appearance and having flanges projecting from its base, constituting a tongue portion, which may be seated in a channel formed in the window frame.

Referring to the numbered parts of the accompanying drawings, in which I have shown a window construction constituting one embodiment of my invention, I have shown an automobile door for a closed body, comprising the door panel, 10, having a window opening in its upper portion, the door panel being provided with the inturned flange, 11, at the bottom of said window opening, to which may be secured an angle strip, 12, forming a sill or finishing member at the lower edge of the window opening. At the sides of the window opening, the panel, 10, is provided with the inturned flanges, 14, as shown in Fig. 2. The door frame is formed by Z-shaped members, 15, each having a lateral flange, 16, over which the panel, 10, is flanged, at 17, and a laterally-extending flange, 18, at the inner side of the door. The window frame is formed by metallic members which are rigidly secured to the flanges, 14 and 18, as shown in Fig. 2. These members are each provided with a portion, 19, applied to and rigidly secured to the flange, 14, an offset portion, 20, forming, with the retaining member hereinafter described, a channel or run for the window-glass, and a further offset portion 21, forming a channel, 23, for the retaining member or strip. The side wall, 22, of the channel, 23, is rigidly secured by welding or otherwise to the flange, 18, of the door frame. A retaining strip or member, 24, is provided, which is formed of a piece of metal bent or pressed to shape to form a finishing molding and provided with a pair of spaced flanges, 25, extending laterally from its base. These flanges constitute a tongue projecting from the base of the retaining member or molding, 24, and positioned in the channel, 23, of the window frame. A layer of felt, 26, may be positioned between one of the flanges, 25, and the side wall, 22, of the channel, 23. When this retaining member is positioned in place, it defines a channel or run for the window-glass, 27, which may have the felt, 28, secured to its edges to prevent contact of the glass with the metal. At the lower edge of the window opening, the flanges, 25, and the channel, 24, may be omitted and the retaining member, 24, may rest directly on the wooden cross member, 29, which is usually provided at this place in the door, for convenience in tacking the upholstery thereto.

It is to be noted that it is necessary to remove these retaining strips or members, 24, before inserting or removing the window pane or glass, 27. I have, therefore, provided means for retaining these strips in position of such a nature that there are no fastening members extending through the strips to mar their appearance. I provide the corner brackets, 30, which have portions extending substantially at right angles to each other and overlapping the adjacent ends of the retaining members, 24. These adjacent ends of the retaining members are spaced somewhat from each other, see Fig. 4, so that they do not interfere with each other when they are being removed. The brackets, 30, are arched and have an inner flange, 31, which engages the inner wall of the retaining member, 24, and an outer flange, 32, which engages the outer edge portion of the member, 24, and are generally curved in cross section to conform to the curve of the retaining strips or moldings, 24. The brackets are retained in place by the bolts, 33, extending between the adjoining ends of the strips, 24, and threaded into the brackets, 34, fastened to the window frame.

It will be observed that the window, 27, may be removed by removing the four bolts, 33, at the corners of the window opening. When these bolts are removed, the brackets may be removed and the retaining strips or members, 24, removed from engagement with the channels, 23, of the window frame. This provides a very convenient and easy way of removing these retaining strips and consequently, the window pane, 27. No fastening bolts or screws pass through the retaining strips, 24, and these may be highly polished so as to add to the ornamentation or finish of the automobile body and a window construction in accordance with my invention presents a very good appearance, due to this fact.

I am aware that the particular window construction disclosed in this specification may be varied considerably without departing from the spirit of my invention, and, therefore, I claim my invention broadly, as indicated by the appended claims.

Having thus described my invention, what I claim as new and useful and desire to secure by Letters Patent is:

1. The combination of a window frame, a window fitting therein, a plurality of retaining strips of arched shaped engaging the edges of said window to hold it in place, brackets at the corners of said window frame, each provided with arched end portions extending at right angles to each other and embracing in the arch the adjacent ends of the retaining strips, and bolts for fastening said brackets to the frame passing between the adjoining ends of said strip.

2. The combination of a window frame having grooves adjacent the top and sides of the window opening and an ungrooved ledge along the bottom of said opening, a window fitting in said frame, retaining strips of one section engaging the edges of said window to hold it in place and provided with portions fitting in said grooves, a retaining strip of different section resting on said ledge and engaging the edge of the window, the ends of adjacent strips being spaced from each other at the corners of the window frame, brackets at the corners of said window frame, each provided with channel shaped end portions extending at right angles to each other and engaging the faces and edges adjoining ends of the retaining strips, and bolts for fastening said brackets to the frame passing between the adjacent ends of said strips.

In testimony whereof I affix my signature.

JOSEPH LEDWINKA.